(12) United States Patent
Xu et al.

(10) Patent No.: US 11,102,477 B2
(45) Date of Patent: *Aug. 24, 2021

(54) DC COEFFICIENT SIGN CODING SCHEME (71) Applicant: GOOGLE LLC, Mountain View, CA (US)

(72) Inventors: Yaowu Xu, Saratoga, CA (US); Jingning Han, Santa Clara, CA (US); Ching-Han Chiang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,544

(22) Filed: Apr. 2, 2020

(65) Prior Publication Data
US 2020/0236350 A1 Jul. 23, 2020

Related U.S. Application Data (63) Continuation of application No. 16/244,674, filed on Jan. 10, 2019, now Pat. No. 10,623,731, which is a (Continued)

(51) Int. Cl.
H04N 19/105 (2014.01)
H04N 19/13 (2014.01)
(Continued)

(52) U.S. Cl.
CPC .......... H04N 19/105 (2014.11); H04N 19/13 (2014.11); H04N 19/167 (2014.11); H04N 19/18 (2014.11); H04N 19/91 (2014.11)

(58) Field of Classification Search
CPC ...... H04N 19/105; H04N 19/13; H04N 19/91; H04N 19/167; H04N 19/18
See application file for complete search history.

(56) References Cited

U.S. PATENT DOCUMENTS 6,449,392 B1 * 9/2002 Divakaran ......... G06K 9/00711
348/E5.067
6,983,079 B2 * 1/2006 Kim .................... H04N 19/593
375/E7.19
(Continued)

FOREIGN PATENT DOCUMENTS

CN 1822677 A 8/2006
CN 102460975 A 5/2012
CN 104041033 A 9/2014

OTHER PUBLICATIONS

Nister D et al: "An embedded DCT-based still image coding algorithm", Acoustics, Speech and Signal Processing; Proceedings of The 1998 IEEE International Conference on Seattle, WA; May 12, 1998, pp. 2617-2620 (Year : 1998).*
(Continued)

Primary Examiner — Dramos Kalapodas
(74) Attorney, Agent, or Firm — Young Basile Hanlon & MacFarlane, P.C.

(57) ABSTRACT

A sign value of a DC coefficient of a current block is determined using neighbor blocks of the current block. First and second sign values are identified as respectively corresponding to an above neighbor block of the current block and a left neighbor block of the current block. A context value is calculated by applying a first weighting value to the first sign value and a second weighting value to the second sign value. The first weighting value is based on a boundary between the above neighbor block and the current block, and the second weighting value is based on a boundary between the left neighbor block and the current block. A probability value is selected based on the context value. The sign value of the DC coefficient of the current block is then determined using the probability model.

20 Claims, 8 Drawing Sheets

Related U.S. Application Data continuation of application No. 15/409,862, filed on Jan. 19, 2017, now Pat. No. 10,194,147.

(51) Int. Cl.
*H04N 19/167* (2014.01)
*H04N 19/18* (2014.01)
*H04N 19/91* (2014.01)

(56) References Cited

U.S. PATENT DOCUMENTS

| | | | |
|---|---|---|---|
| 7,738,554 B2* | 6/2010 | Lin | H04N 19/625 375/240.03 |
| 8,902,988 B2 | 12/2014 | Sole Rojals et al. | |
| 9,106,913 B2 | 8/2015 | Sole Rojals et al. | |
| 9,253,481 B2 | 2/2016 | Seregin et al. | |
| 2003/0223584 A1 | 12/2003 | Bradley et al. | |
| 2005/0041738 A1* | 2/2005 | Lin | H04N 19/184 375/240.03 |
| 2006/0188164 A1* | 8/2006 | Lee | H04N 19/18 382/238 |
| 2007/0019871 A1* | 1/2007 | Kim | H04N 19/124 382/236 |
| 2007/0110153 A1* | 5/2007 | Cho | H04N 19/593 375/240.12 |
| 2009/0066790 A1 | 3/2009 | Hammadou | |
| 2013/0182758 A1* | 7/2013 | Seregin | H04N 19/119 375/240.02 |
| 2014/0010292 A1* | 1/2014 | Rapaka | H04N 19/176 375/240.12 |
| 2014/0362925 A1 | 12/2014 | Nguyen et al. | |
| 2015/0092862 A1* | 4/2015 | Yu | H04N 19/593 375/240.18 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion for International Patent Application No. PCT/US2017/059241 dated Mar. 12, 2018.
Nister D et al: "An embedded DCT-based still image coding algorithm", Acoustics, Speech and Signal Processing; Proceedings of The 1998 IEEE International Conference on Seattle, WA; May 12, 1998, pp. 2617-2620.

* cited by examiner

DC COEFFICIENT SIGN CODING SCHEME

CROSS-REFERENCE TO RELATED APPLICATION(S)

This disclosure is a continuation of U.S. patent application Ser. No. 16/244,674, filed Jan. 10, 2019, which is a continuation of U.S. patent application Ser. No. 15/409,862, filed Jan. 19, 2017, the disclosures of which are incorporated by reference herein in their entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

This disclosure relates generally to encoding and decoding video data and more particularly relates to a DC coefficient sign coding scheme for encoding and decoding blocks of video frames.

A method according to an implementation of this disclosure comprises: determining a value for a transform block by: for each of one or more above neighbor blocks of the transform block: identifying a sign value of a DC coefficient of the above neighbor block; and adjusting the value according to the sign value of the DC coefficient of the above neighbor block; and, for each of one or more left neighbor blocks of the transform block: identifying a sign value of a DC coefficient of the left neighbor block; and adjusting the value according to the sign value of the DC coefficient of the left neighbor block; responsive to determining the value for the transform block, identifying a probability model for a DC coefficient of the transform block based on the value; and determining a sign value of the DC coefficient of the transform block using the probability model.

A method according to another implementation of this disclosure comprises: determining a context value for a sign value of a DC coefficient of a transform block based on sign values of one or more above neighbor blocks of the transform block and based on sign values of one or more left neighbor blocks of the transform block; selecting a probability model to use to decode the transform block including by determining the sign value of the DC coefficient of the transform block, wherein the probability model indicates probabilities of the sign value of the DC coefficient of the transform block being positive, negative, or zero; and decoding the transform block according to the probability model.

A method according to yet another implementation of this disclosure comprises: decoding a transform block from a bitstream including by determining a sign value of a DC coefficient of the transform block based on sign values of DC coefficients of one or more neighbor blocks of the transform block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or frames, into smaller portions, such as blocks, and generating an encoded bitstream using techniques to limit the information included for respective blocks thereof. The encoded bitstream can be decoded to re-create the source images from the limited information. For example, a video compression scheme can include transforming motion vector residuals for a current block of a video stream into transform blocks of transform coefficients. The transform coefficients are quantized and entropy coded into an encoded bitstream. A decoder uses the encoded transform coefficients to decode or decompress the encoded bitstream to prepare the video stream for viewing or further processing.

The transform coefficients in a transform block can include a DC coefficient, which is located at the top-left of the transform block and has a magnitude representing the average value of the transform coefficients. Typical video compression techniques use a bit to signal the sign of a DC coefficient to a decoder, which may be positive or negative. For example, the decoder can determine that the sign of the DC coefficient is negative when the bit has a value of zero and positive when the bit has a value of one. However, contextual information about the sign of the DC coefficient is not signaled to the decoder. Because a video sequence may include a large number of DC coefficients, using a correspondingly large number of bits to signal the signs of the DC coefficients imposes additional cost on the video compression.

Implementations of this disclosure address problems such as these by determining a sign value of a DC coefficient of a current block using contextual information about the sign of the DC coefficient of neighbor blocks of the current block. First and second sign values are identified as respectively corresponding to an above neighbor block of the current block and a left neighbor block of the current block. A context value is calculated by applying a first weighting value to the first sign value and a second weighting value to the second sign value. The first weighting value is based on a boundary between the above neighbor block and the current block and the second weighting value is based on a boundary between the left neighbor block and the current block. A probability model usable for determining the sign value of the DC coefficient of the current block is selected based on the context model. The sign value of the DC coefficient of the current block is then determined using the probability model. The efficiency of coding DC coefficients can thus be improved, such as by not using bits to signal respective sign values of the blocks of a video sequence.

Figure 1:
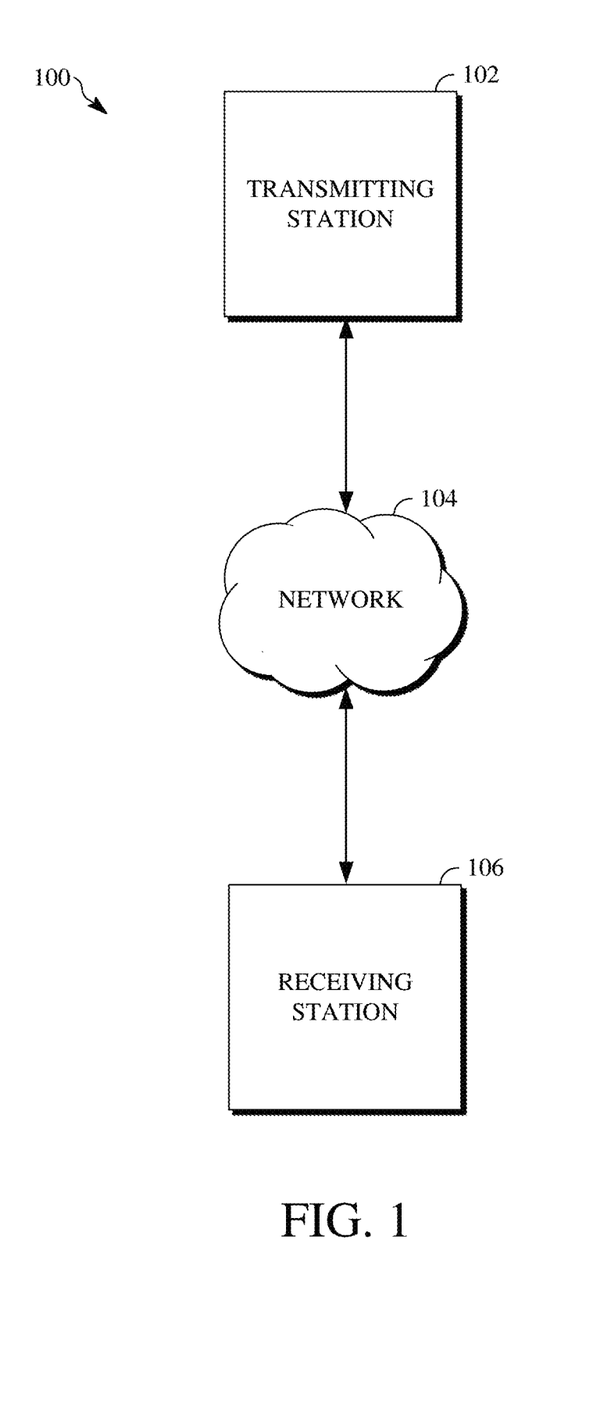
FIG. 1 is a schematic of a video encoding and decoding system.

Further details of techniques for coding DC coefficient sign values are described herein with initial reference to a system in which the techniques can be implemented. FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
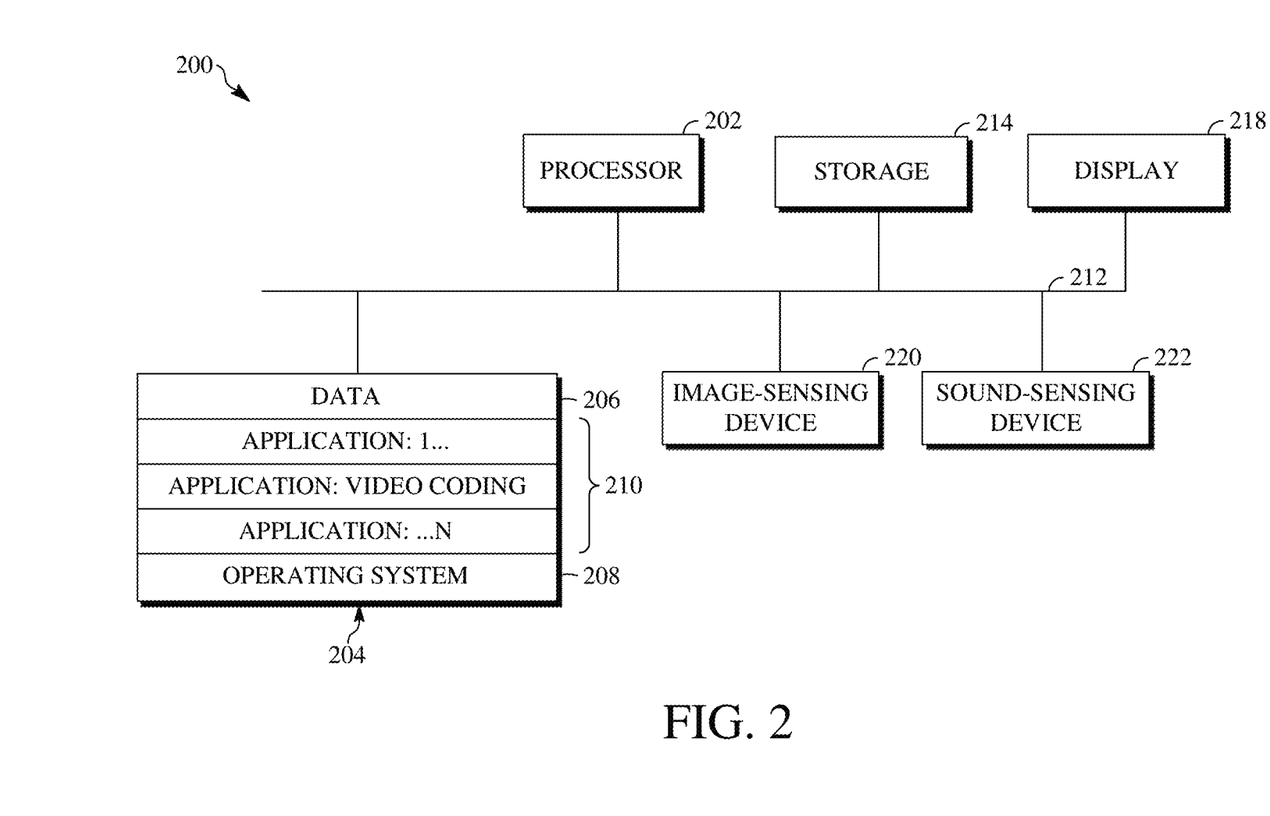
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown (e.g., the CPU 202), advantages in speed and efficiency can be achieved by using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
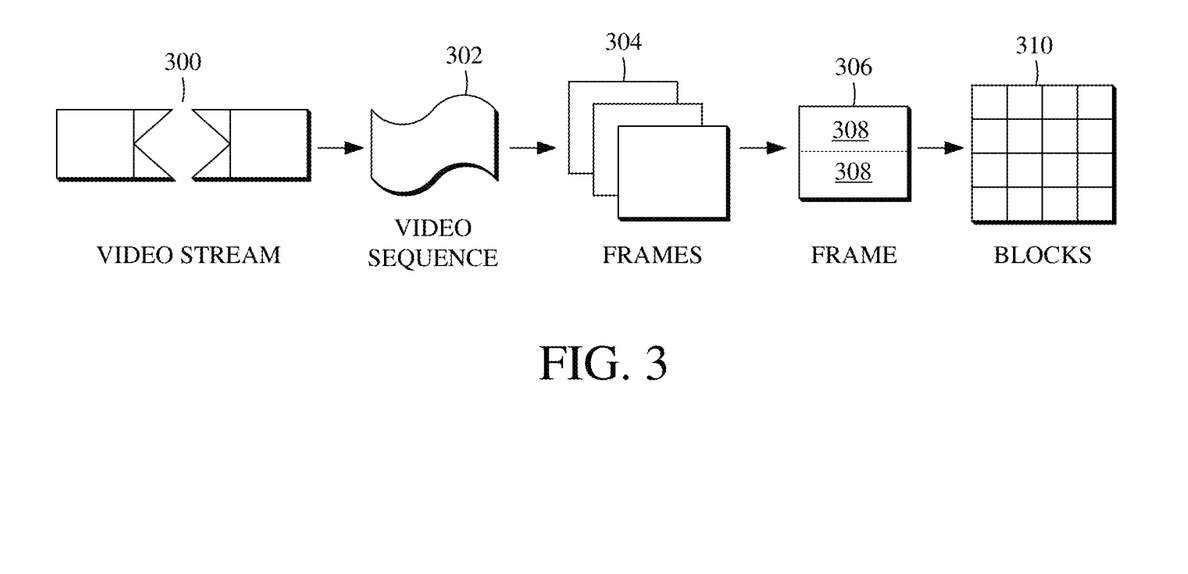
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
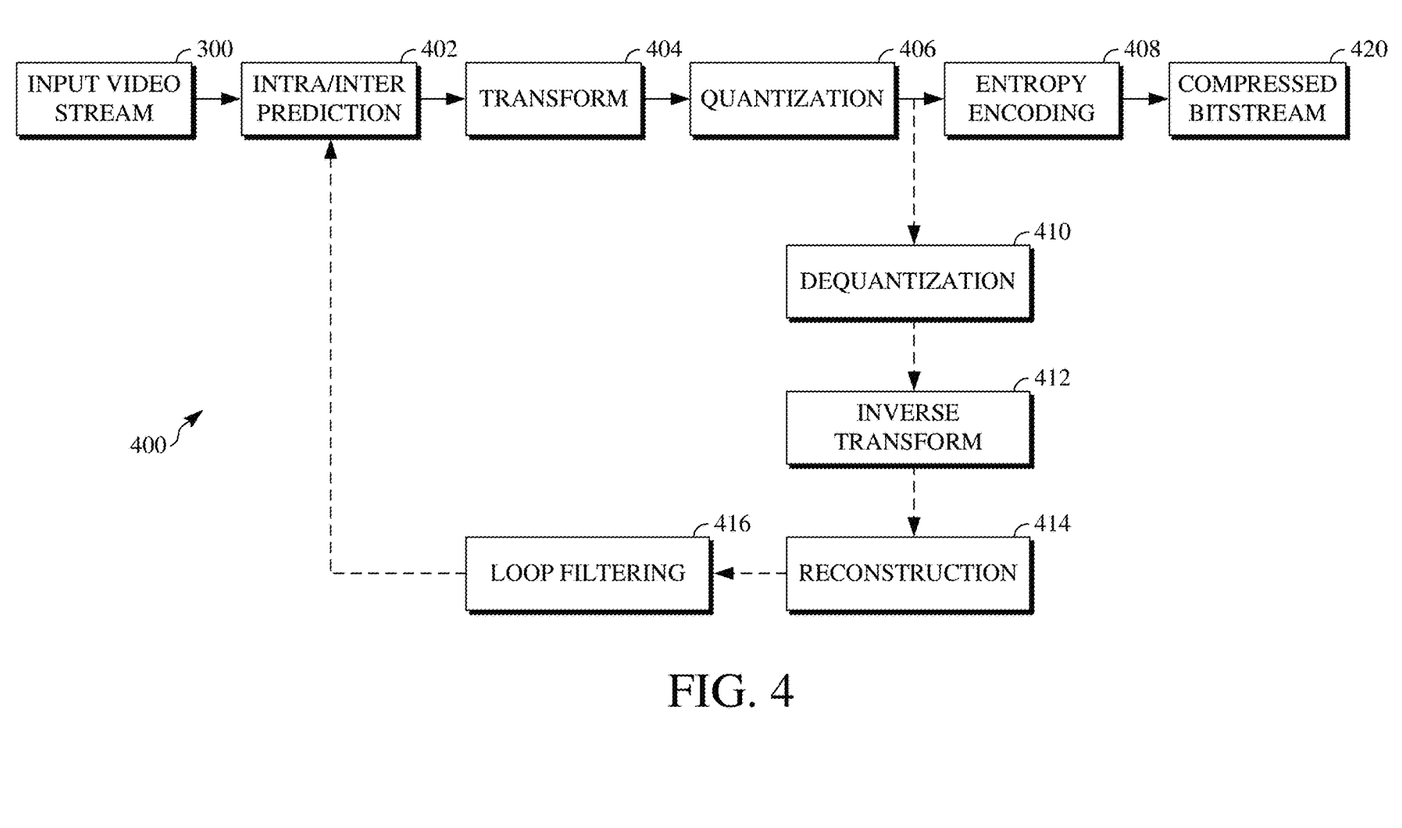
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block (which may, for example, include the type of prediction used, transform type, motion vectors, and quantizer value), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions (discussed in more detail below) that take place during the decoding process, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
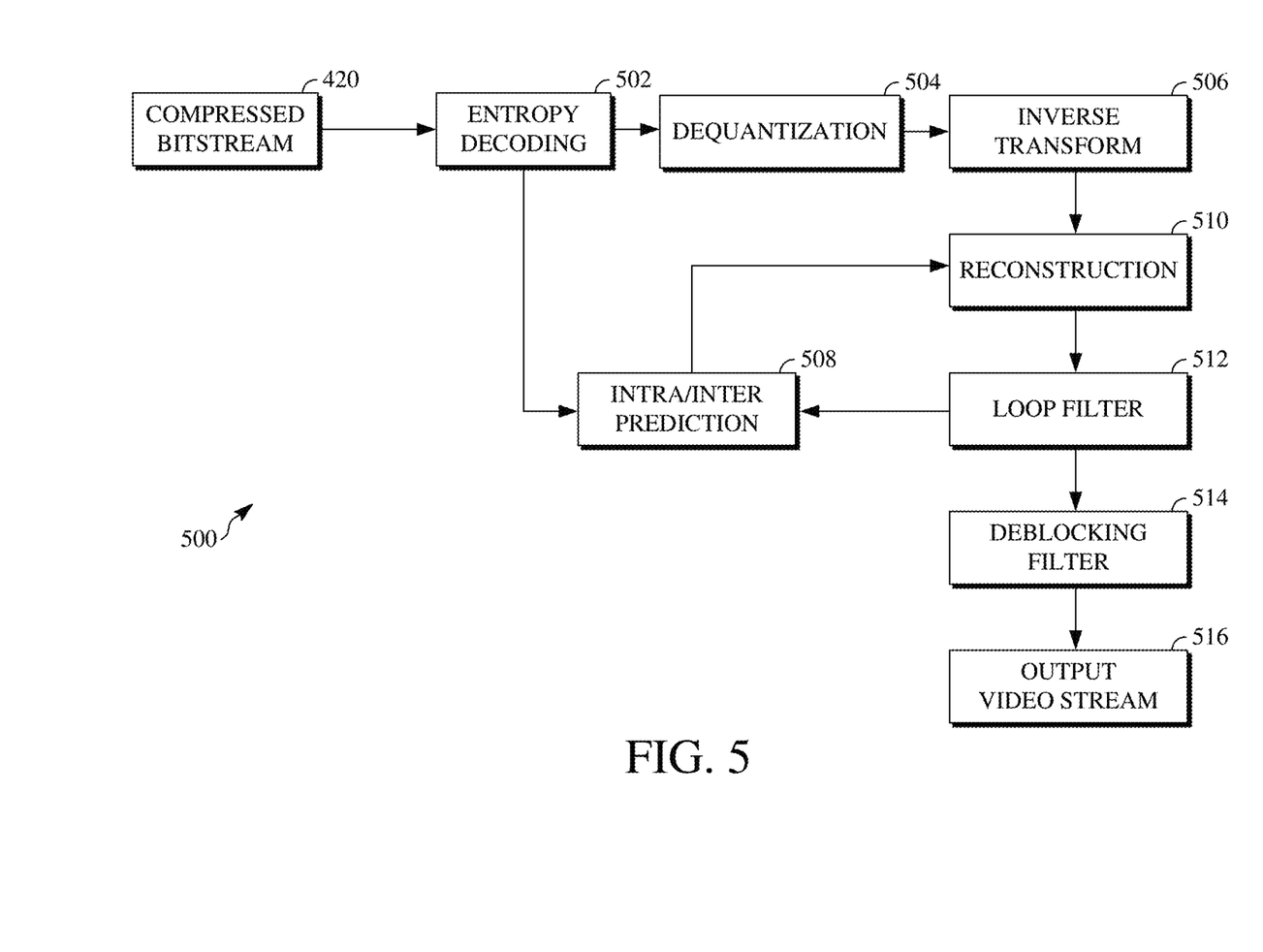
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
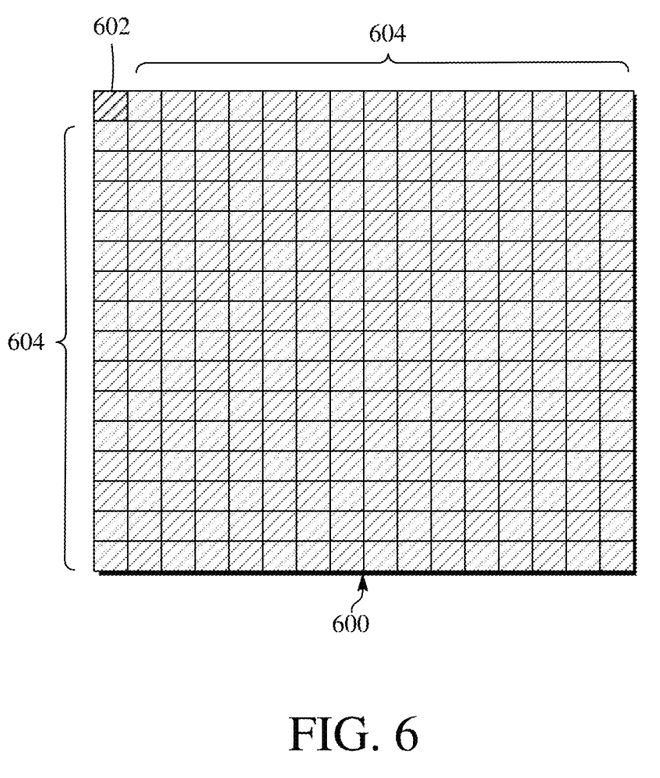
FIG. 6 is an illustration of an example of coefficients of a transform block.

FIG. 6 is an illustration of an example of coefficients of a transform block 600. The transform block 600 includes one DC coefficient 602 and a number of AC coefficients 604. For example, because the transform block 600 is a 16×16 transform block comprising 216 pixels, the transform block includes 215 AC coefficients.

The DC coefficient 602 and the AC coefficients 604 of the transform block 600 are transformed residual pixel values. The residual pixel values may be generated by a prediction operation (e.g., the intra/inter prediction stage 402 shown in FIG. 4) and transformed by a transform operation (e.g., the transform stage 404 shown in FIG. 4). For example, a discrete cosine transform can be applied to move the coefficients to different positions within the transform block 600. The transformation of the residual pixel values results in the DC coefficient 602 being located at the top-leftmost position of a transform block and the AC coefficients 604 being located at the other positions of the transform block.

The DC coefficient 602 of the transform block 600 has a magnitude that represents an average of the transformed residual pixel values of the transform block (e.g., the AC coefficients 604). The DC coefficient 602 thus has a sign value. The sign value is positive where the magnitude is above zero and negative where the magnitude is below zero. The sign value may not be negative or positive where the magnitude is equal to zero. Alternatively, the sign value may by default be configured to be one of positive or negative where the magnitude is equal to zero.

Figure 7:
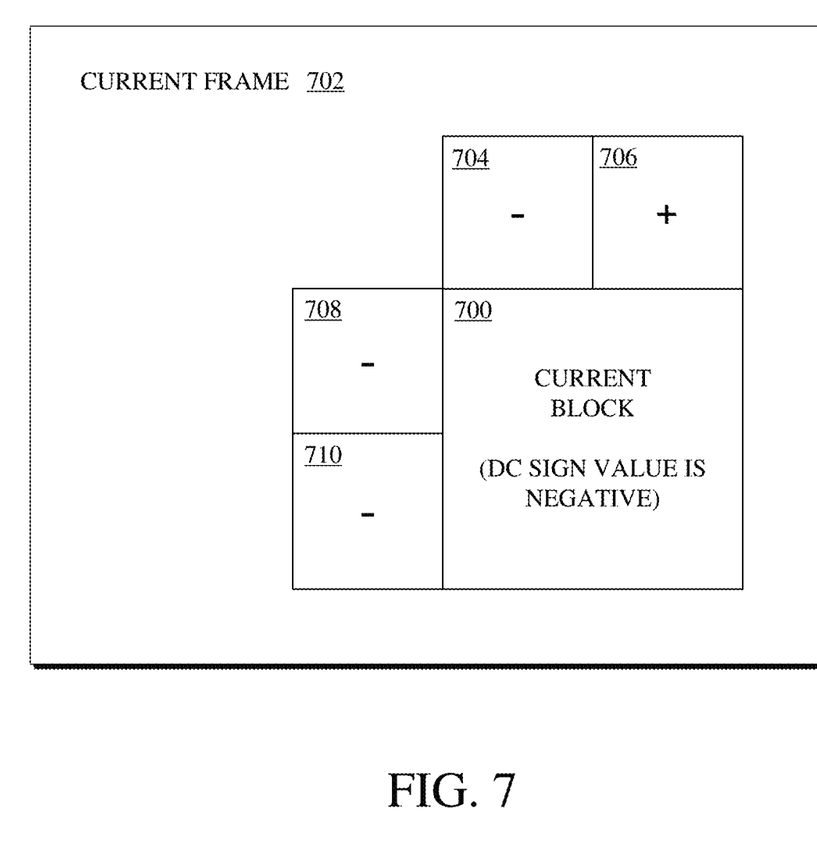
FIG. 7 is an illustration of an example of neighbor blocks used to determine the sign value of the DC coefficient of a current block.

FIG. 7 is an illustration of an example of neighbor blocks used to determine the sign value of the DC coefficient of a current block 700. The current block 700 is one of a number of transform blocks (e.g., the transform block 600 shown in FIG. 6) of a current frame 702. The current frame 702 also includes an above neighbor block 704, an above neighbor block 706, a left neighbor block 708, and a left neighbor block 710. The neighbor blocks 704, 706, 708, and 710 are transform blocks and spatial neighbors of the current block 700.

The sign value of the DC coefficient of the current block 700 is determined using a probability model selected based on the sign values of the DC coefficients of the neighbor blocks 704, 706, 708, and 710. A context value can be calculated based on the sign values of the DC coefficients of the neighbor blocks 704, 706, 708, and 710. A probability model corresponding to the calculated context value can be determined for determining the sign value of the DC coefficient of the current block. The sign value of the DC coefficient of the current block can then be determined using the selected probability model.

The context value is calculated using the following formula:

$$dc\_sum = \sum_{nb\_blocks} dc\_sign(nb\_block) * boundary(nb\_block, curr\_block)$$

where dc_sum is the context value, nb_blocks is the total number of neighbor blocks, dc_sign(nb_block) is the sign value of a current neighbor block, and boundary(nb_block, curr_block) is the length of the boundary between the current neighbor block and the current block. Accordingly, the context value is calculated by applying a weighting value to respective sign values of the DC coefficients of the neighbor blocks 704, 706, 708, and 710. The weighting value applied to such a sign value is determined based on a number of pixels comprising a length of a boundary between the neighbor block having the sign value and the current block.

For example, as shown in FIG. 7, each of the neighbor blocks 704, 706, 708, and 710 has an equally long length of boundary with the current block 700. As such, the same weighting value (e.g., 1) is applied for each of the neighbor blocks 704, 706, 708, and 710. The neighbor blocks 704, 708, and 710 have a negative sign value for their DC coefficients, while the neighbor block 706 has a positive sign value for its DC coefficient. As such, the context value for the blocks shown in FIG. 7 equals −2 (e.g., dc_sum=−1+1+−1+−1). In another example, such as where the neighbor block 704 is not present and the boundary between the neighbor block 706 and the current block 700 extends for the entire length of the upper boundary of the current block, the neighbor block 706 would have a weighting value (e.g., 2) that is twice the weighting value applied to the sign values of the neighbor blocks 708 and 710 (e.g., 1). In that case, the context value would equal 0 (e.g., dc_sum=2+−1+−1).

The probability value used for determining sign value of the DC coefficient of the current block is selected based on the calculated context value using the following Table 1:

TABLE 1

| Probability Model Index | Context Value (dc_sum) |
|---|---|
| 0 | Greater than 0 |
| 1 | Less than 0 |
| 2 | Equal to 0 |

As such, when the context value is calculated to be greater than 0, a first probability model (e.g., having a probability model index of 0) is selected; when the context value is calculated to be less than 0, a second probability model (e.g., having a probability model index of 1) is selected; and when the context value is calculated to be equal to 0, a third probability model (e.g., having a probability model index of 2) is selected. Referring back to the example shown in FIG. 7, where the context value is calculated to be −2, the second probability model is selected for determining the sign value for the DC coefficient of the current block 700.

A probability model usable for determining the sign value for the DC coefficient of the current block 700 indicates a probability that the sign value for the DC coefficient of the current block 700 is positive, negative, or equal to zero. The probability model can include an integer value that, when divided by a maximum value, indicates the probability of the sign value for the DC coefficient of the current block 700 being positive, negative, or equal to zero (e.g., represented as a percentage or like value). The maximum value can be a global maximum value shared by all or a portion of the probability models usable by the techniques of this disclosure.

For example, the maximum value can be in the scale of 256. A probability model having the probability model index 0 can include the integer value 119. When the context value indicates to select that probability model, that probability model indicates that there is a 119/256 probability that the sign value of the DC coefficient of the current block 700 is positive. That probability model further indicates that there is a (256−119)/256 probability that the sign value of the DC coefficient of the current block 700 is negative.

The probabilities associated with a probability model are processed using entropy coding (e.g., the entropy coding stage 408 shown in FIG. 4). For example, arithmetic coding can be used to determine the sign value of the DC coefficient of the current block 700 using the probabilities associated with a selected probability model. For example, once the sign value of the DC coefficient of the current block 700 is determined by the entropy coding stage 408 of the encoder 400, it can be compressed into an encoded bitstream.

The probability models that can be selected based on the context value can be updated, such as based on results of a decoding process using the probability models (e.g., by the decoder 500 shown in FIG. 5). For example, if the results of a decoding process that use a first probability model (e.g., having a probability model index of 0) indicate that the sign value of the DC coefficient of the current block 700 more often is determined to be positive, that probability model can be updated, such as by updating the integer value thereof. Updating the probability models in this way may improve the efficiency of the entropy coding and/or decoding of the sign values of the DC coefficients of current blocks.

In some implementations, the sign value can be represented other than as in Table 1, above. For example, the sign values can be indicated using integers, such as where the sign value of the DC coefficient of the current block is 0 when the context value is equal to 0, 1 when the context value is less than 0, and 2 when the context value is greater than 0. The integer value can be passed between an encoder and decoder to indicate the sign value of the DC coefficient of the current block, such as when the sign value of the DC coefficient of the current block is encoded and/or decoded with reference to a coefficient sign map.

Figure 8:
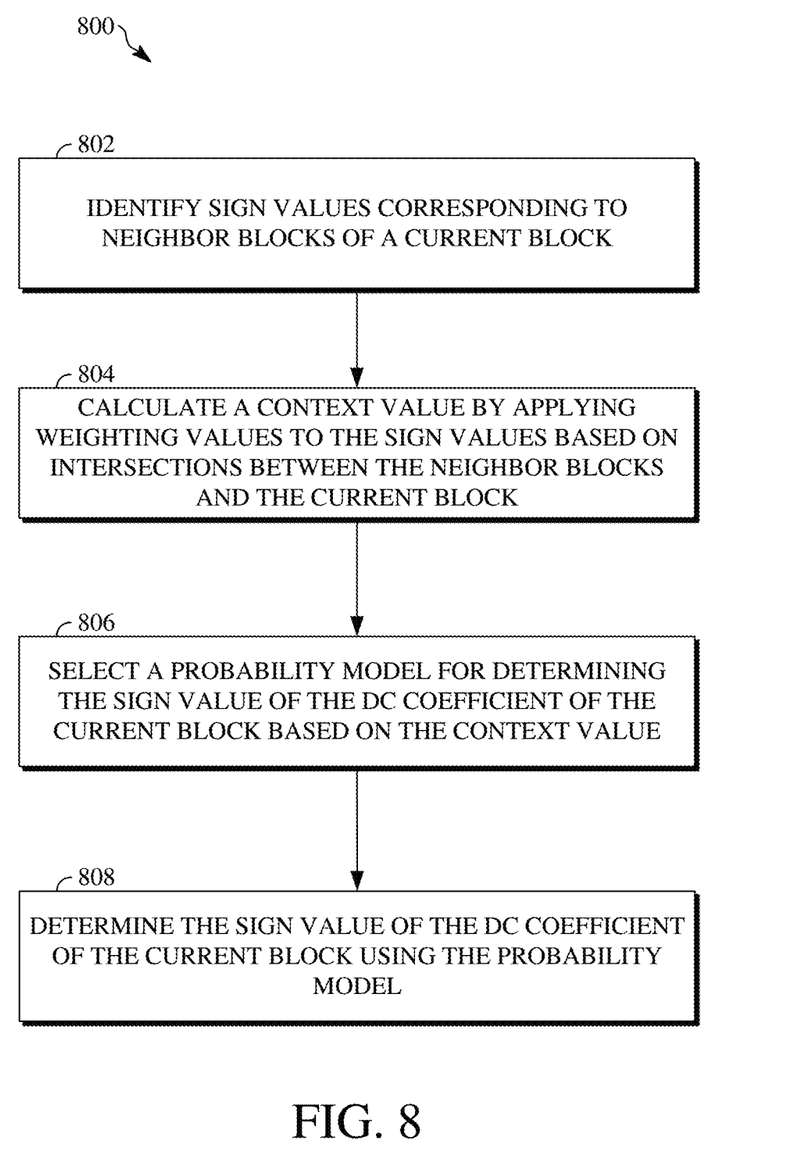
FIG. 8 is a flowchart diagram of a process for DC coefficient sign coding.

FIG. 8 is a flowchart diagram of a process 800 for DC coefficient sign coding. The process 800 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the CPU 202, may cause the computing device to perform the process 800. The process 800 can be implemented using specialized hardware or firmware. As explained above, some computing devices may have multiple memories or processors, and the operations described in the process 800 can be distributed using multiple processors, memories, or both.

At 802, sign values of DC coefficients of one or more neighbor blocks of a current block are identified. Identifying the sign values of the DC coefficients of the neighbor blocks can include receiving those sign values from a database or other data store (including, but not limited to, a block header or a frame header), generating those sign values such as using instructions executable by a processor (e.g., during an encoding or decoding process, such as is generally shown in FIGS. 4 and 5, respectively), identifying those sign values within a coefficient sign map, other techniques for identifying those sign values, or combinations thereof.

Identifying the sign values of the DC coefficients of the neighbor blocks may first include identifying the neighbor blocks within a frame of a video sequence, where the frame also includes the current block. For example, identifying the neighbor blocks can include identifying a position of the current block within the frame and then identifying one or more blocks that are adjacent to one of an upper boundary, left boundary, lower boundary, or right boundary of the current block.

When the frame that includes the current block is encoded or decoded according to a raster order or similar order for processing the blocks thereof, the neighbor blocks identified for use by the process 800 may be above neighbor blocks of the current block or left neighbor blocks of the current block. For example, identifying the sign values of the DC coefficients of the neighbor blocks can include identifying a first sign value corresponding to a DC coefficient of an above neighbor block of the current block and a second sign value corresponding to a DC coefficient of a left neighbor block of the current block. However, other neighbor blocks may be used by the process 800, such as where blocks within a frame of a video sequence are not encoded or decoded according to a raster order or similar order.

At 804, a context value is calculated by applying weighting values to the sign values identified at 802. The weighting values are determined based on the number of pixels comprising the length of boundary between corresponding ones of the neighbor blocks and the current block. For example, where the neighbor blocks identified at 802 include an above neighbor block and a left neighbor block, a first weighting value is determined based on a first number of pixels comprising the boundary between the above neighbor block and the current block, and a second weighting value is determined based on a second number of pixels comprising the boundary between the left neighbor block and the current block.

Calculating the context value first includes multiplying sign values and corresponding weighting values for respective ones of the neighbor blocks having a sign value identified at 802. For example, a first value can be calculated for the above neighbor block described above by multiplying its sign value and the first weighting value, and a second value can be calculated for the left neighbor block by multiplying its sign value and the second weighting value. The context value can then be calculated by adding the calculated values for the respective neighbor blocks. For example, the context value can be calculated by adding the first value and the second value described above.

As such, as used herein, a context value refers to the sum of a plurality of values calculated by multiplying sign values and weighting values for respective ones of a plurality of neighbor blocks. However, a context value may alternatively refer to the product of a sign value and a weighting value for an individual neighbor block. For example, there may be multiple context values calculated to determine the sign value of the DC coefficient of a current block.

For example, calculating multiple context values at 806 can include deriving context values for respective ones of the neighbor blocks by multiplying a sign value of a DC coefficient of the neighbor block and a number of pixels comprising a boundary between the neighbor block and the current block. The context values may then be added together to calculate a value usable for determining the sign value of the DC coefficient of the current block, as described below.

At 806, a probability model usable for determining the sign value of the DC coefficient of the current block is selected based on the context value calculated at 804 (or plurality of context values, as applicable). For example, a first probability model is selected when the context value is greater than zero, a second probability model is selected when the context value is less than zero, and a third probability model is selected when the context value is equal to zero.

At 808, the probability model selected at 806 is used to determine the sign value of the DC coefficient of the current block. For example, an integer value of the selected probability model can be compared to a maximum value thereof to determine the probabilities that the sign value of the DC coefficient of the current block is positive, negative, or zero. In an encoding process, those probabilities are used by an entropy coding stage (e.g., the entropy coding stage 408 shown in FIG. 4) to determine the sign value of the DC coefficient of the current block, such as using arithmetic coding, and then compress the determined sign value into an encoded bitstream. In a decoding process, those probabilities are used by an entropy decoding stage (e.g., the entropy decoding stage 502 shown in FIG. 5) to determine the sign value of the DC coefficient of the current block based on values compressed within an encoded bitstream.

However, in some implementations, when the context value equals zero, the sign value of the DC coefficient of the current block is determined to be an average of sign values of a plurality of AC coefficients of the current block. That is, the context value is used to determine a sign value of the DC coefficient of the current block based on the neighbor blocks. When the context value is zero, it means that the neighbor blocks do not indicate a likelihood of the sign value of the DC coefficient of the current block. In these cases, the sign value of the DC coefficient of the current block is calculated using data of the current block independently of data from the neighbor blocks. A sign value calculated independently of data from neighbor blocks can be signaled using a bit or compressed within the encoded bitstream (e.g., within a block or frame header, as part of a coefficient sign map, etc.).

For simplicity of explanation, the process 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

In some implementations, the sign value of the DC coefficient of a current block can be determined without using sign values of DC coefficients of neighbor blocks of the current block. For example, the process 800 can include determining an average residual pixel value for respective neighbor blocks, wherein the average residual pixel value is a mean of the coefficients of the neighbor block resulting after the block is transformed. In some implementations, calculating an average residual pixel value for a neighbor block can include adding individual residual pixel values of the neighbor block and dividing the sum thereof by the total number of residual pixels within the neighbor block. The sign value of the calculated average residual pixel value may then be used to determine the sign value of the DC coefficient of the current block in place of the sign value of the DC coefficient of that neighbor block.

In some implementations, the process 800 can be a process for determining a sign value of a non-DC coefficient of the current block using the neighbor blocks of the current block. For example, the process 800 can be performed to infer an average sign value for the residual pixels of the current block. The average sign value for the residual pixels of the current block can be calculated using average residual pixel values of neighbor blocks, for example, calculated as described above.

The process 800 can be performed by an encoder, such as the encoder 400 shown in FIG. 4, and/or a decoder, such as the decoder 500 shown in FIG. 5. When the process 800 is performed by an encoder, the sign value of the DC coefficient of the current block can be determined responsive or otherwise proximate to the transform operation (e.g., the transform stage 404 shown in FIG. 4). For example, the process 800 can be performed using transform blocks comprising transformed residual pixel values, wherein the residual pixel values are determined via a prediction operation (e.g., the intra/inter prediction stage 402 shown in FIG. 4).

Separately, when the process 800 is performed by a decoder, the sign value of the DC coefficient of the current block can be determined during or otherwise proximate to an inverse transform operation (e.g., the inverse transform stage 506 shown in FIG. 5). For example, the process 800 can be performed to decode the transformed residual pixel values of the current block by identifying the sign value of the DC coefficient of the current block using the sign values of the DC coefficients of the neighbor blocks of the current block.

In some implementations, such as where the process 800 is performed by an encoder, the process 800 can include an operation for compressing the sign value of the DC coefficient of the current block. For example, the compressed sign value of the DC coefficient of the current block may be included within a block header corresponding to the current block within an encoded bitstream. In another example, the compressed sign value of the DC coefficient of the current block may be included within a frame header corresponding to a frame including the current block within an encoded bitstream. In yet another example, the compressed sign value of the DC coefficient of the current block may be encoded as part of a coefficient sign map for the current block, the frame that includes the current block, or another structure within the encoded bitstream.

In some implementations, such as where the process 800 is performed by a decoder, the process 800 can include an operation for decompressing the compressed sign value of the DC coefficient of an encoded current block. For example, the decoder can receive the compressed sign value of the DC coefficient of the encoded current block from a block header corresponding to the encoded current block within an encoded bitstream. In another example, the decoder can receive the compressed sign value of the DC coefficient of the encoded current block from a frame header corresponding to an encoded frame including the encoded current block within the encoded bitstream. In yet another example, the decoder can receive the compressed sign value of the DC coefficient of the encoded current block from a coefficient sign map for the encoded current block, the encoded frame that includes the encoded current block, or another structure within the encoded bitstream.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using the encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding an encoded transform block from a bitstream based on a sign value of a DC coefficient of encoded transform block, the method comprising:
    determining a value for the encoded transform block as a sum of a first value and a second value, in which:
        the first value is calculated by adding weighted sign values of DC coefficients of one or more above neighbor blocks of the encoded transform block; and
        the second value is calculated by adding weighted sign values of DC coefficients of one or more left neighbor blocks of the encoded transform block;

responsive to determining the value for the encoded transform block, identifying a probability model for the DC coefficient of the encoded transform block based on the value;

determining the sign value of the DC coefficient of the encoded transform block using the probability model; and decoding the encoded transform block to an output bitstream based on the sign value of the DC coefficient of the encoded transform block.

2. The method of claim 1, wherein the probability model is a first probability model when the value is less than zero, wherein the probability model is a second probability model when the value is greater than zero, and wherein the probability model is a third probability model when the value is equal to zero.

3. The method of claim 1, further comprising:

updating the probability model based on the determination of the sign value of the DC coefficient of the encoded transform block.

4. The method of claim 1, wherein the probability model includes an integer value that, when divided by a maximum value, indicates a probability of the sign value of the DC coefficient of the encoded transform block being positive, negative, or zero.

5. The method of claim 1, wherein the weighted sign value of the DC coefficient of an above neighbor block is calculated by applying a first weighting value defined by a length of a boundary between the above neighbor block and the encoded transform block to a sign value of the DC coefficient of the above neighbor block, and wherein the weighted sign value of the DC coefficient of a left neighbor block is calculated by applying a second weighting value defined by a length of a boundary between the left neighbor block and the encoded transform block to a sign value of the DC coefficient of the left neighbor block.

6. The method of claim 1, wherein, when the value is equal to zero, identifying the probability model for the DC coefficient of the encoded transform block based on the value comprises:

identifying the probability model for the DC coefficient of the encoded transform block based on one or more AC coefficients of the encoded transform block.

7. The method of claim 1, wherein the probability model indicates probabilities of the sign value of the DC coefficient of the encoded transform block being positive, negative, or zero.

8. A method for decoding an encoded transform block from a bitstream based on a sign value of a DC coefficient of encoded transform block, comprising:

determining a context value for the sign value of the DC coefficient of the encoded transform block based on sign values of one or more above neighbor blocks of the encoded transform block and based on sign values of one or more left neighbor blocks of the encoded transform block;

selecting a probability model to use to decode the encoded transform block including by determining the sign value of the DC coefficient of the encoded transform block, wherein the probability model indicates probabilities of the sign value of the DC coefficient of the encoded transform block being positive, negative, or zero; and decoding the encoded transform block according to the probability model.

9. The method of claim 8, wherein determining the context value for the sign value of the DC coefficient of the encoded transform block based on the sign values of the one or more above neighbor blocks of the encoded transform block and based on the sign values of the one or more left neighbor blocks of the encoded transform block comprises:

adding a first value and a second value, in which the first value is calculated by adding weighted sign values of DC coefficients of one or more above neighbor blocks of the encoded transform block; and the second value is calculated by adding weighted sign values of DC coefficients of one or more left neighbor blocks of the encoded transform block.

10. The method of claim 9, wherein the weighted sign value of the DC coefficient of an above neighbor block is calculated by multiplying the sign value of the DC coefficient of the above neighbor block and a first weighting value defined by a length of a boundary between the above neighbor block and the encoded transform block, and wherein the weighted sign value of the DC coefficient of a left neighbor block is calculated by multiplying the sign value of the DC coefficient of the left neighbor block and a second weighting value defined by a length of a boundary between the left neighbor block and the encoded transform block.

11. The method of claim 10, further comprising:

determining the first weighting value based on a number of pixels comprising the boundary between the above neighbor block and the encoded transform block; and determining the second weighting value based on a number of pixels comprising the boundary between the left neighbor block and the encoded transform block.

12. The method of claim 8, wherein, when the context value is equal to zero responsive to the adjustments based on the sign values of the one or more above neighbor blocks and based on the sign values of the one or more left neighbor blocks, the context value is determined based on one or more AC coefficients of the encoded transform block.

13. The method of claim 8, wherein the probability model is a first probability model when the value is less than zero, wherein the probability model is a second probability model when the value is greater than zero, and wherein the probability model is a third probability model when the value is equal to zero.

14. The method of claim 8, wherein probabilities of the probability model are calculated using a global maximum value shared by multiple probability models available for decoding the encoded transform block.

15. A method, comprising:

decoding an encoded transform block from a bitstream including by determining a sign value of a DC coefficient of the encoded transform block based on sign values of DC coefficients of one or more neighbor blocks of the encoded transform block.

16. The method of claim 15, wherein determining the sign value of the DC coefficient of the encoded transform block based on the sign values of DC coefficients of the one or more neighbor blocks of the encoded transform block comprises:

identifying a probability model for the DC coefficient of the encoded transform block based on the sign values of DC coefficients of the one or more neighbor blocks; and determining the sign value of the DC coefficient of the encoded transform block using the probability model.

17. The method of claim 16, wherein determining the sign value of the DC coefficient of the encoded transform block based on the sign values of DC coefficients of the one or more neighbor blocks of the encoded transform block comprises:
- determining a value for the encoded transform block by adding weighted sign values of DC coefficients of the one or more neighbor blocks of the encoded transform block, and
- wherein identifying the probability model for the DC coefficient of the encoded transform block based on the sign values of DC coefficients of the one or more neighbor blocks comprises:
- selecting the probability model using the value determined for the encoded transform block.

18. The method of claim 17, wherein the probability model is a first probability model when the value is less than zero, wherein the probability model is a second probability model when the value is greater than zero, and wherein the probability model is a third probability model when the value is equal to zero.

19. The method of claim 17, wherein the weighted sign value of a DC coefficient of a neighbor block
- is calculated by applying a weighting value defined by a length of a boundary between the neighbor block and the encoded transform block to a sign value of the DC coefficient of the neighbor block.

20. The method of claim 18, wherein the one or more neighbor blocks comprise one or more above neighbor blocks and one or more left neighbor blocks.

\* \* \* \* \*